US012020595B2

(12) United States Patent
Liu et al.

(10) Patent No.: US 12,020,595 B2
(45) **Date of Patent: *Jun. 25, 2024**

(54) SYSTEM AND METHOD FOR DISPERSING PARTICLES WITHIN A TOY OR ORNAMENT AND TOY OR ORNAMENT INCORPORATING THE SAME

(71) Applicant: East West Basics (HK) Limited, New York, NY (US)

(72) Inventors: GuiFen Liu, Shenzhen (CN); NingBo Li, Huiyang (CN)

(73) Assignee: East West Basics (HK) Limited, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,250

(22) Filed: Feb. 23, 2023

(65) Prior Publication Data

US 2023/0196951 A1 Jun. 22, 2023

Related U.S. Application Data

(63) Continuation of application No. 17/369,065, filed on Jul. 7, 2021, now Pat. No. 11,626,042.

(51) Int. Cl.
*G09F 19/02* (2006.01)

(52) U.S. Cl.
CPC .................................... *G09F 19/02* (2013.01)

(58) Field of Classification Search
CPC ........................................................ G09F 19/02
See application file for complete search history.

(56) References Cited

U.S. PATENT DOCUMENTS

| | | | | | |
|---|---|---|---|---|---|
| 4,000,679 | A * | 1/1977 | Norman | G09F 19/02 | 84/DIG. 9 |
| 5,884,423 | A * | 3/1999 | Lo | G09F 19/08 | 40/410 |
| 6,550,169 | B1 * | 4/2003 | Sena | G09F 19/02 | 40/406 |
| 7,040,050 | B2 * | 5/2006 | Skinner | G09F 19/10 | 40/410 |
| 2002/0106249 | A1 * | 8/2002 | Lin | G09F 19/02 | 406/106 |
| 2005/0039358 | A1 * | 2/2005 | Rust | G09F 19/18 | 40/410 |
| 2015/0269878 | A1 * | 9/2015 | Wong | G09F 19/02 | 446/267 |

* cited by examiner

*Primary Examiner* — Gary C Hoge
(74) *Attorney, Agent, or Firm* — Amster, Rothstein & Ebenstein LLP

(57) ABSTRACT

A method of making a decorative enclosure including providing a display portion having a top opening, a front portion and a back portion. A screen is disposed over the top opening of the display portion. The screen slopes downwards from the back portion to the front portion of the display portion and includes a plurality of screen openings configured to allow passage of particles for the simulation of falling snow within the display portion.

12 Claims, 13 Drawing Sheets

SYSTEM AND METHOD FOR DISPERSING PARTICLES WITHIN A TOY OR ORNAMENT AND TOY OR ORNAMENT INCORPORATING THE SAME

RELATED APPLICATIONS

This application is a continuation of U.S. patent application Ser. No. 17/369,065, filed Jul. 7, 2021 and entitled SYSTEM AND METHOD FOR DISPERSING PARTICLES WITHIN A TOY OR ORNAMENT AND TOY OR ORNAMENT INCORPORATING THE SAME, the contents of which are incorporated herein by reference in their entirety.

FIELD

The present invention is generally related to toys or ornaments in which decorative particles are dispersed to simulate falling snow.

BACKGROUND

A snow globe is a transparent sphere, traditionally made of glass, enclosing a miniaturized scene of some sort, often together with a model of a town, landscape or figure. The sphere also encloses the water in the globe; the water serves as the medium through which the “snow” falls. To activate the snow, the globe is shaken to churn up the white particles. The globe is then placed back in its position and the flakes fall slowly through the water. Snow globes sometimes have a built-in music box that plays a song. Some snow globes have a design around the outer base for decoration. Snow globes are often used as a collectible item.

Known variations on the water-filled globe include snow lanterns that use forced-air to disperse the snow. These have a base with a blower, forcing air which carries polystyrene pellets from the bottom and through a tube to the top of the lantern, where they are blown out and fall around the scene. At least the sides of the lantern may be made of transparent material, such as, for example, transparent vinyl or glass. These lanterns are typically large decorations for the front yard and may be lighted internally with incandescent light bulbs.

Although the blower tube openings in conventional snow lanterns are typically hidden (for example, behind or within a Christmas tree model), the snow is seen by viewers as originating at specific points at the top of the lantern that correspond to the tube openings. This results in an unrealistic simulation of falling snow, which of course in real life does not originate from specific points in the sky but instead falls evenly across and around a scene.

Accordingly, there is a need for an improved design for a snow lantern that more realistically simulates falling snow.

SUMMARY

To address the above, the present disclosure is generally related to an improved snow lantern in which particles simulating snow are distributed evenly across a screen so that the particles fall in a more realistic manner over a scene within the lantern.

A snow lantern according to an exemplary embodiment of the present invention comprises: a display portion comprising a top opening; and a screen disposed over the top opening of the display portion, the screen comprising a plurality of screen openings through which pass particles for the simulation of falling snow within the display portion.

In an exemplary embodiment, the snow lantern further comprises two or more first tubes through with the particles are blown upwards through the display portion and over a top surface of the screen.

In an exemplary embodiment, the screen comprises two or more first tube connection openings in communication with the two or more first tubes.

In an exemplary embodiment, the two or more first tube connection openings comprise fittings that direct the particles over the top surface of the screen.

In an exemplary embodiment, the fittings direct the particles at an angle that is 80° to 100° relative to a longitudinal axis of the tubes.

In an exemplary embodiment, the fittings direct the particles at an angle that is 90° relative to a longitudinal axis of the tubes.

In an exemplary embodiment, the snow lantern further comprises two or more second tubes that house electrical wiring.

In an exemplary embodiment, the screen comprises two or more second tube connection openings in communication with the two or more second tubes.

In an exemplary embodiment, the display portion comprises a front portion and a back portion, and the screen is sloped downwardly from the back portion to the front portion.

In an exemplary embodiment, the screen is sloped at an angle of 10° to 30°.

In an exemplary embodiment, the screen is sloped at an angle of 20°.

In an exemplary embodiment, the screen has a profile that is convex relative to the top opening of the display portion.

A snow lantern according to an exemplary embodiment of the present invention comprises: a display portion comprising a top opening; a screen disposed over the top opening of the display portion, the screen comprising a plurality of screen openings; and two or more first tubes through with particles are blown upwards through the display portion and over a top surface of the screen so that the particles pass through the screen openings for the simulation of falling snow within the display portion, wherein: the two or more first tube connection openings comprise fittings that direct the particles over the top surface of the screen at an angle that is 80° to 100° relative to a longitudinal axis of the tubes, the display portion comprises a front portion and a back portion, and the screen is sloped downwardly at an angle of 10° to 30° from the back portion to the front portion, and the screen has a profile that is convex relative to the top opening of the display portion.

BRIEF DESCRIPTION OF THE DRAWINGS

Exemplary embodiments of the present disclosure will be described with references to the accompanying figures, wherein.

DETAILED DESCRIPTION

The present disclosure is generally related to an improved snow lantern that simulates falling snow in a realistic manner. To achieve this objective, according to an exemplary embodiment, a snow lantern includes a screen at a top portion of the lantern over which are blown particles fed from one or more tubes. The particles then fall through openings in the screen and cascade downward around the scene within the lantern in a uniform manner. In exemplary embodiments, the screen is arranged in a specific manner within the lantern and includes specific features that result in more effective dispersal of the particles.

Figure 1:
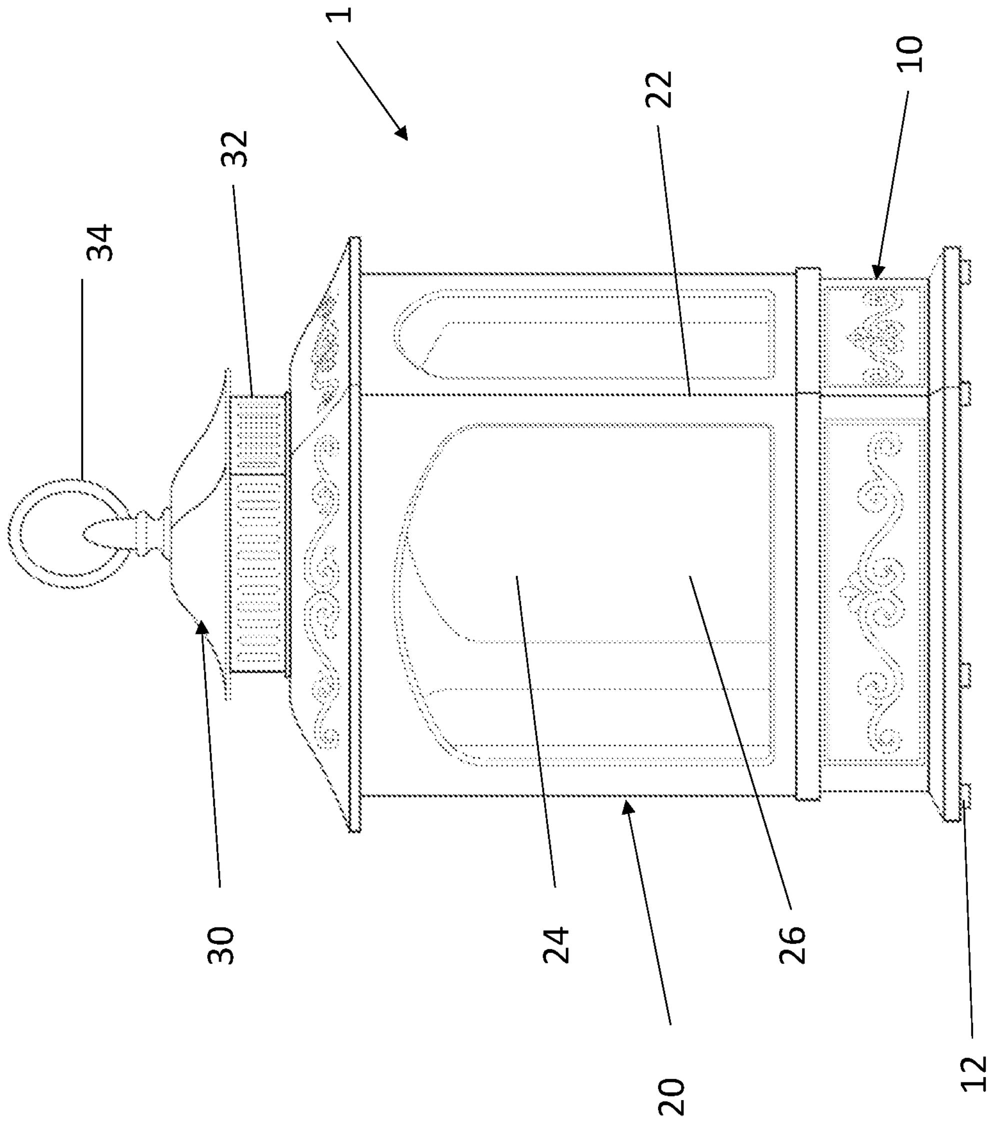
FIG. 1 is a perspective view of a snow lantern according to an exemplary embodiment of the present invention.
Figure 2:
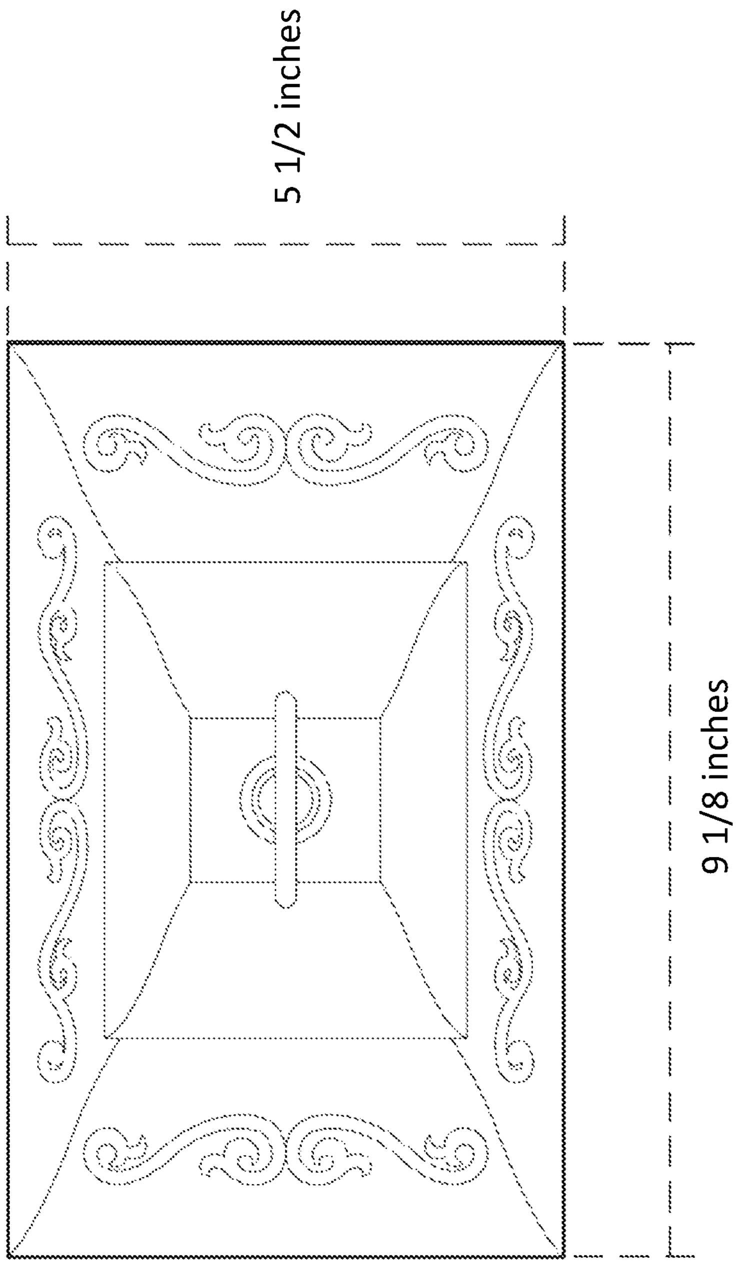
FIG. 2 is a top view of a snow lantern according to an exemplary embodiment of the present invention.
Figure 3:
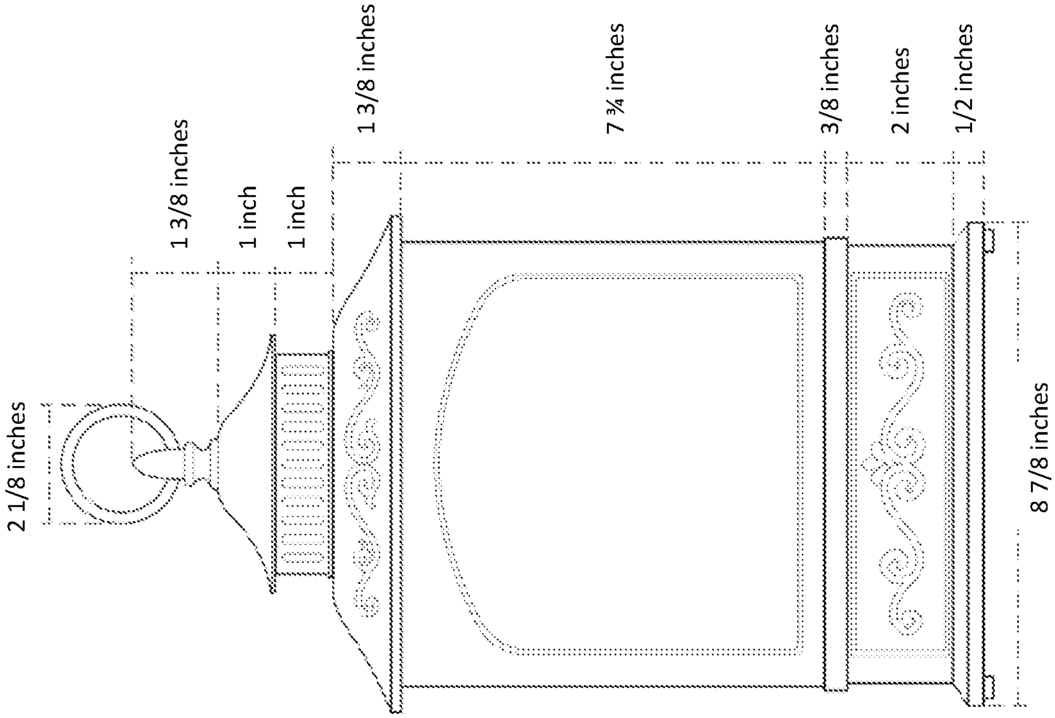
FIG. 3 is a front view of a snow lantern according to an exemplary embodiment of the present invention.
Figure 4:
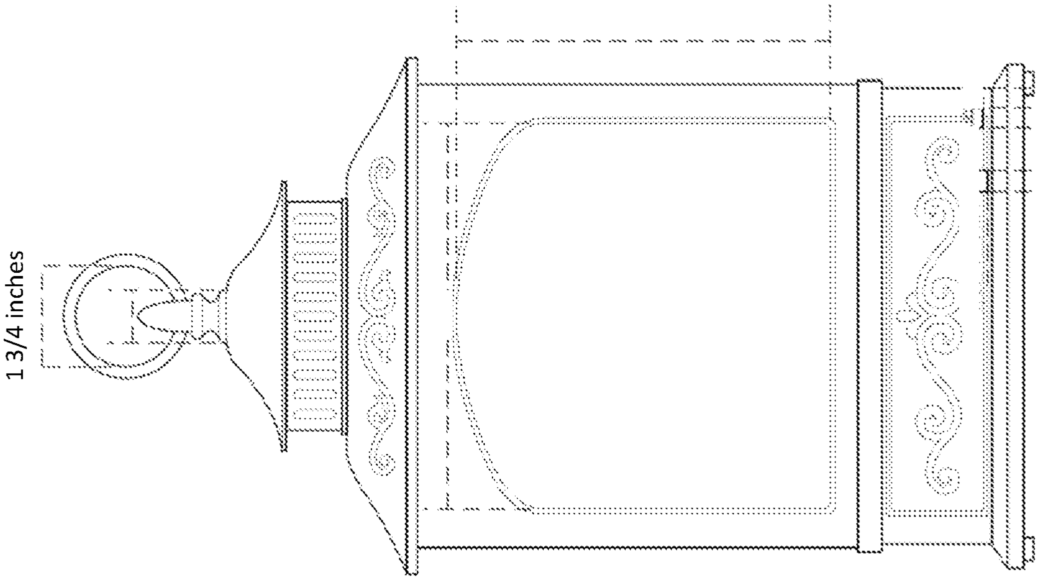
FIG. 4 is a back view of a snow lantern according to an exemplary embodiment of the present invention.
Figure 5:
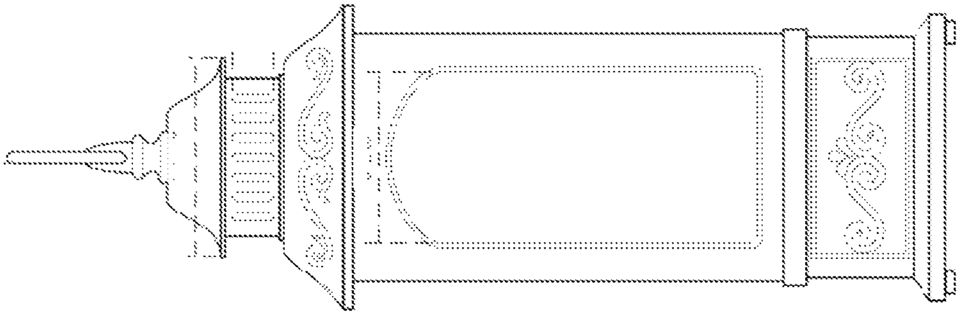
FIG. 5 is a side view of a snow lantern according to an exemplary embodiment of the present invention.

FIG. 1 is a perspective view of a snow lantern, generally designed by reference number 1, according to an exemplary embodiment of the present invention. The snow lantern 1 includes a base portion 10, a display portion 20 and a cap portion 30.

The base portion 10 may include support elements, such as, for example, feet 12 that may be placed directly in contact with the ground.

The display portion 20 is disposed above and supported by the base portion 10. The display portion 20 includes a frame 22 that defines openings 24. Sheets 26 of transparent material are disposed within the openings 24 through which may be viewed a display scene (not shown) within the display portion 20. The transparent material may be, for example, plastic or glass. The openings 24 are illustrated as having a generally rectangular shape, but may have any other suitable shape, such as, for example, circular, square, or triangular, to name a few.

The cap portion 30 is disposed on top of the display portion 20. The cap portion 30 may include a ventilator 32 and a fixture loop 34. The fixture loop 34 may be used to hang the snow lantern 1 to a fixture, such as, for example, a post or a hook mounted on a wall.

FIG. 1 and FIGS. 2-5 show various views of the lantern 1 along with corresponding dimensions. However, it should be appreciated that the dimensions are not limited to those shown in the drawings, and the lantern 1 may have any other suitable dimensions.

Figure 6:
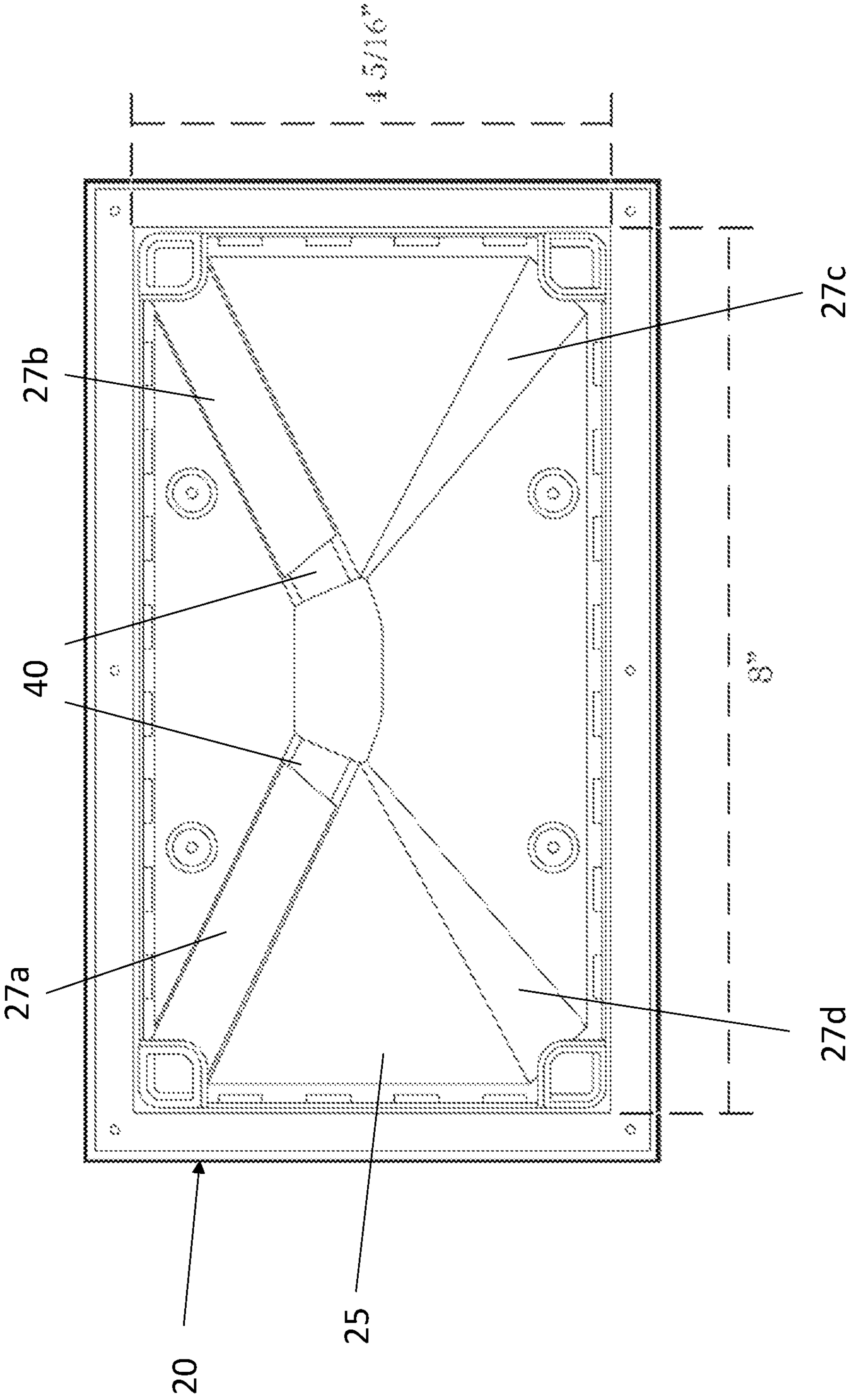
FIG. 6 is a top view of a display portion of a snow lantern according to an exemplary embodiment of the present invention.
Figure 7:
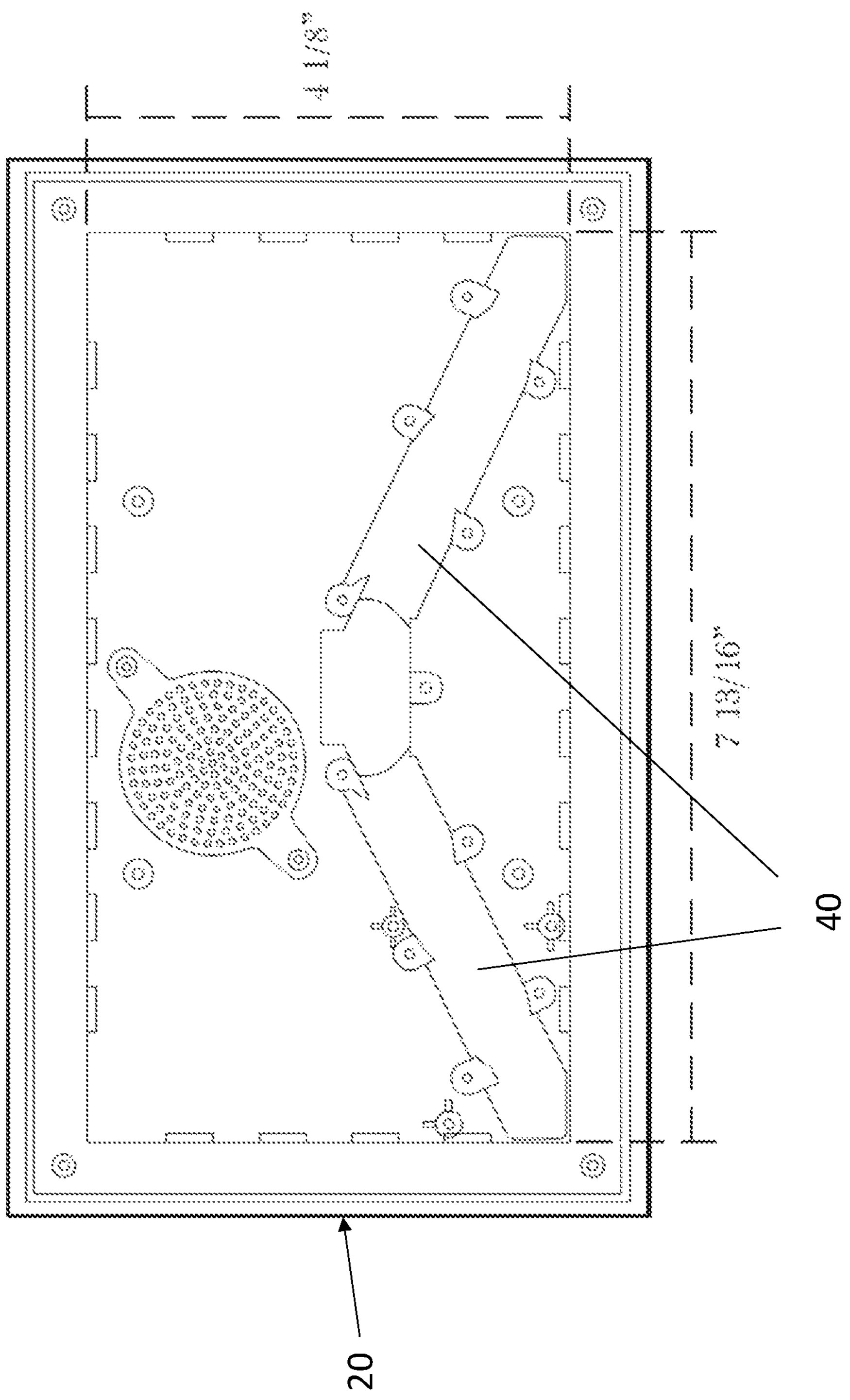
FIG. 7 is a bottom view of a display portion of a snow lantern according to an exemplary embodiment of the present invention.

FIG. 6 is a top view of the display portion 20 showing a top opening 25 of the display portion 20 and FIG. 7 is a bottom view of the glob portion 20. Tubes 27*a*, 27*b*, 27*c* and 27*d* run vertically from the bottom to the top of the display portion 20. In an exemplary embodiment of the invention, at least a pair of the tubes 27*a*, 27*b* are in communication with blower pipes 40 (FIG. 7) through which are fed forced air from a blower (not shown) positioned in the base portion 10. The forced air sucks the particles simulating snow from the bottom of the display portion 20 into the blower pipes 40, and in turn into the pair of tubes 27*a* 27*b* in communication with the blower pipes 40. As described below, this construction allows the pair of tubes 27*a*,27*b* to direct the particles to the top of the display portion 20, where the particles are then evenly distributed across the top opening 25 of the display portion 20 before falling back down over the display scene. In exemplary embodiments, the particles may be made of white-colored plastic.

The tubes 27*c*, 27*d* not used to direct the forced air may be used to house electrical wiring running from an internal or external power supply (not shown) into the display portion 20 to power lighting elements or other electrical elements of the display scene.

Figure 8B:
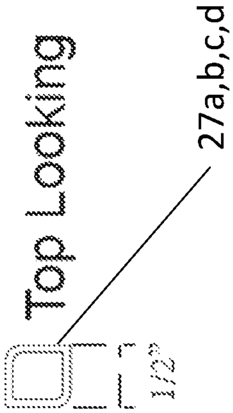
FIGS. 8A and 8B are side and top views, respectively, of tubes of a snow lantern according to an exemplary embodiment of the present invention.
Figure 8A:
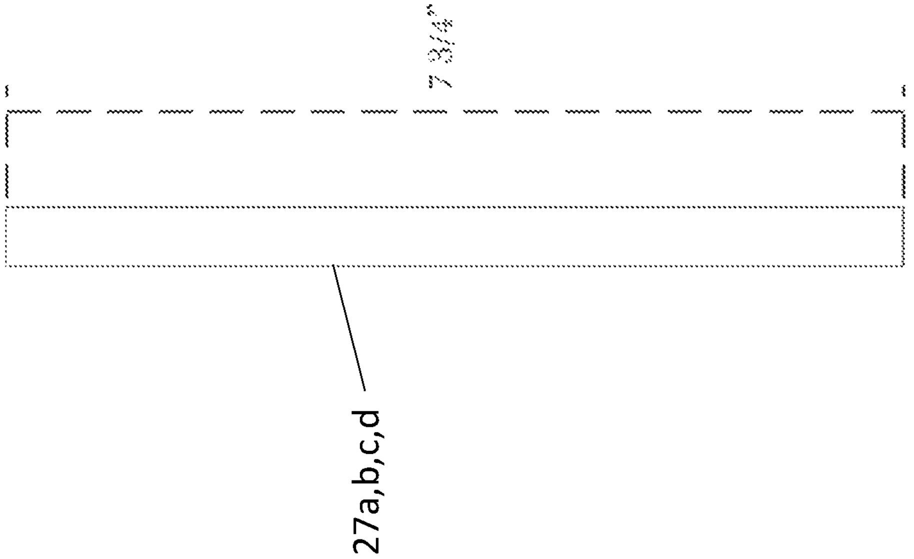

The tubes 27*a*, 27*b*, 27*c*, and 27*d* are preferably aligned with the frame 22 of the display portion 20 so that the tubes 27*a*, 27*b*, 27*c*, and 27*d* are at least partially hidden from view. For example, if the frame 22 is rectangular in shape, the tubes 27*a*, 27*b*, 27*c*, and 27*d* may be aligned with the frame elements at the four corners of the frame 22. As shown in FIGS. 8A and 8B, the tubes 27*a*, 27*b*, 27*c*, and 27*d* have a generally rectangular cross section, although it should be appreciated that the tubes 27*a*, 27*b*, 27*c*, and 27*d* may have any other cross-sectional shape, such as, for example, circular, square, or triangular, to name a few.

Figure 9:
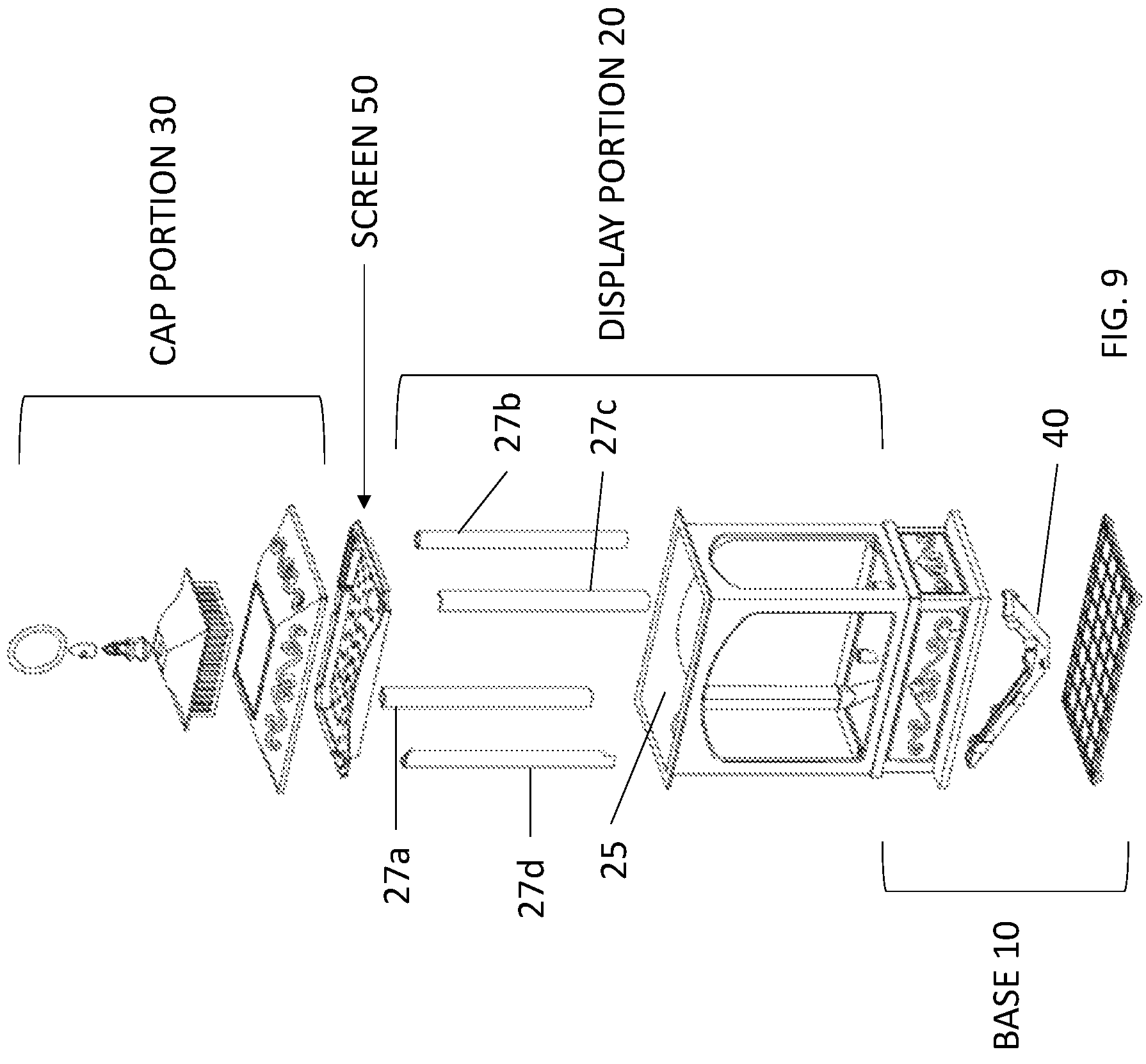
FIG. 9 is an exploded view of a snow lantern according to an exemplary embodiment of the present invention.
Figure 10A:
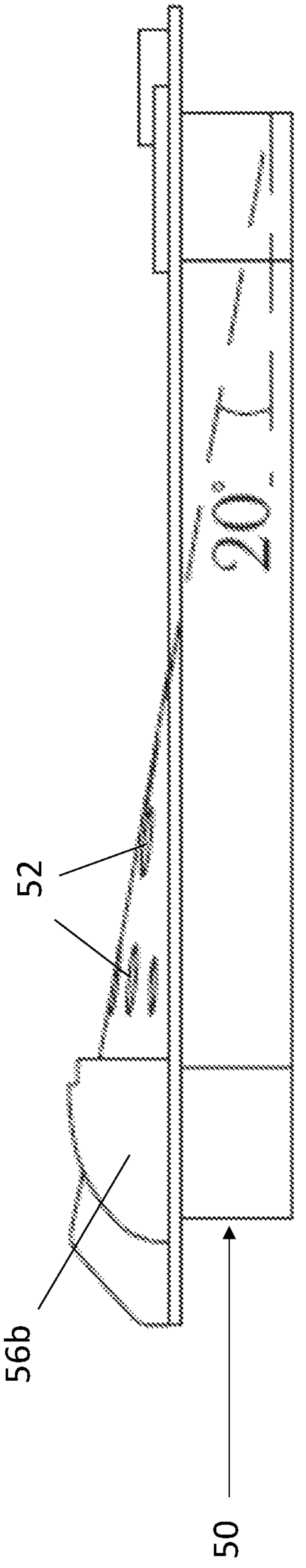
FIG. 10A is a side view of a screen of a snow lantern according to an exemplary embodiment of the present invention.

As shown in FIG. 9, a screen 50 is positioned on top of the display portion 20 to cover the top opening 25 of the display portion 20. FIG. 10A shows a side view of the screen 50, FIG. 10B shows a back view of the screen 50, FIG. 10C shows a front view of the screen 50, FIG. 10D shows a top view of the screen 50, and FIG. 10E shows a bottom view of the screen 50.

The screen 50 includes a number of screen openings 52. As explained in further detail below, the screen openings 52 are arrayed across the entire screen 50 so that particles blown out on top of the screen may fall through the screen openings 52 in an evenly distributed manner. In exemplary embodiments, the screen openings 52 are circular, and may include openings that are of all the same size or which vary in size from one another. In a specific exemplary embodiment, some of the screen openings 52 have a diameter of 5⁄16" and some of the screen openings 52 have a diameter of ¼". It should be appreciated that the screen openings 52 may have any other shape, such as, for example, rectangular, square or triangular, to name a few.

As shown in FIG. 10A, the screen 50 slopes downwardly from the back towards the front of the top opening 25 of the display portion 20. In exemplary embodiments, the angle of the slope may be in the range of 10° to 30°, preferably 15° to 25°, and in a preferred example, 20°.

Figure 10B:
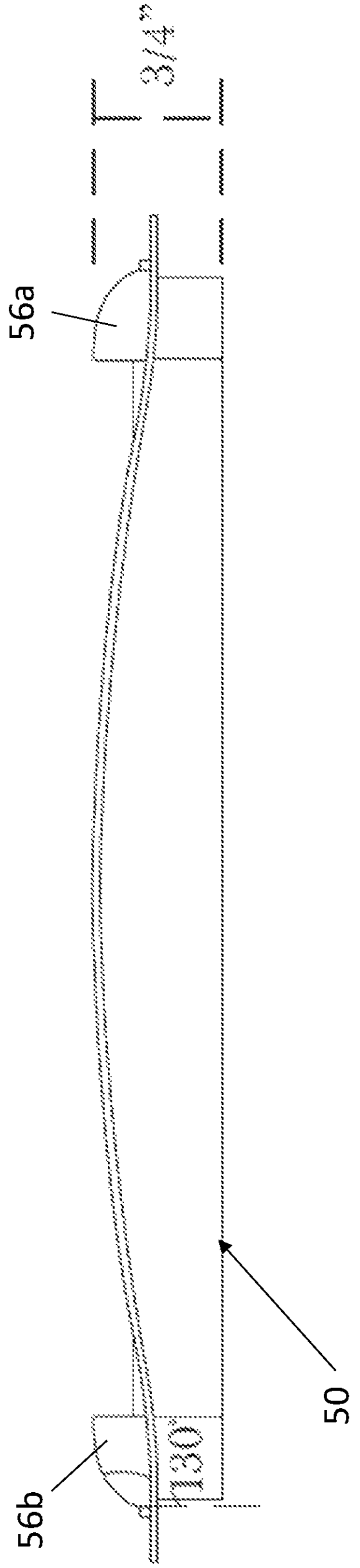
FIG. 10B is a back view of a screen of a snow lantern according to an exemplary embodiment of the present invention.
Figure 10C:
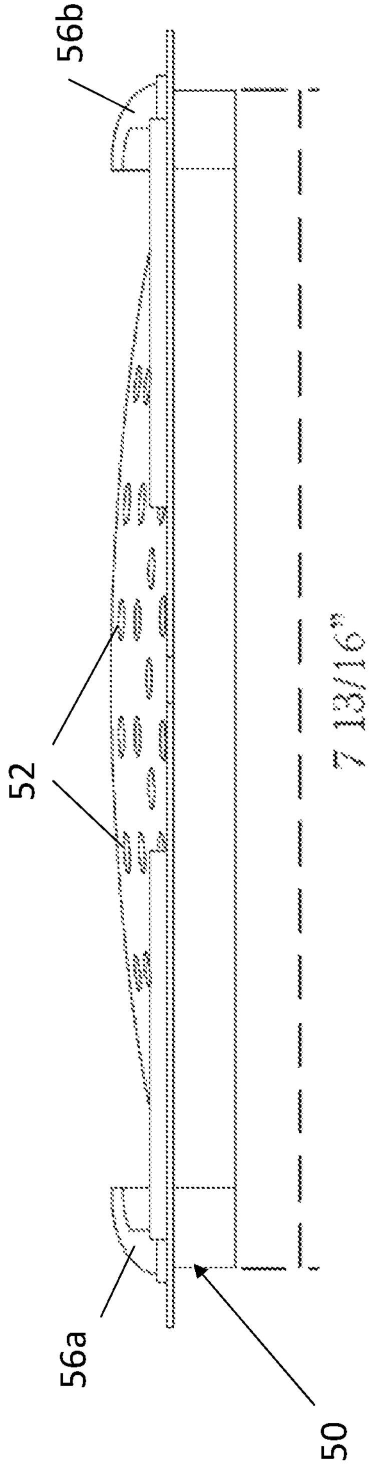
FIG. 10C is a front view of a screen of a snow lantern according to an exemplary embodiment of the present invention.
Figure 10D:
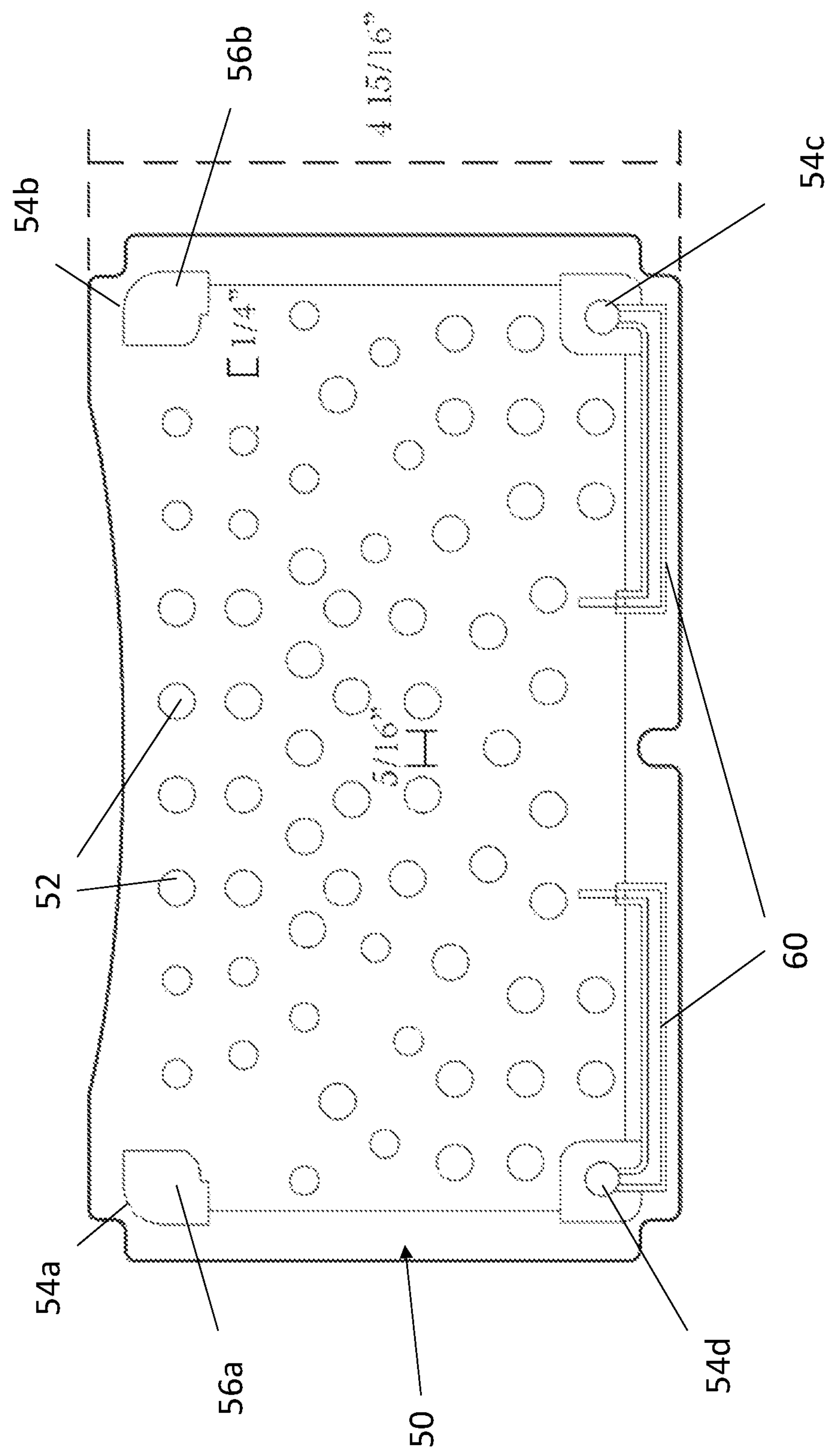
FIG. 10D is a top view of a screen of a snow lantern according to an exemplary embodiment of the present invention.
Figure 10E:
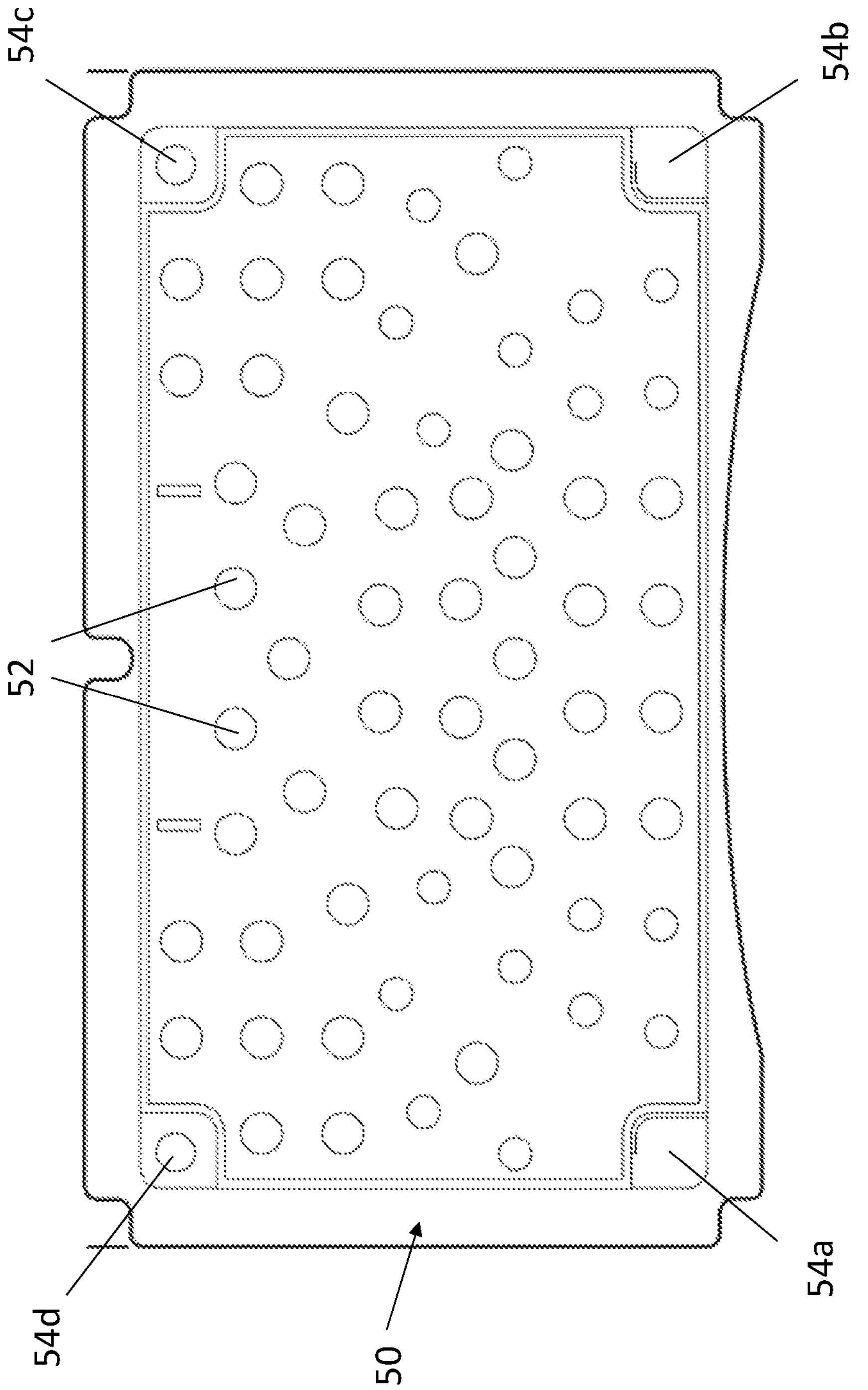
FIG. 10E is a bottom view of a screen of a snow lantern according to an exemplary embodiment of the present invention.

As best seen in FIGS. 10B and 10C, the screen 50 has a profile that follows a convex curvature relative to the top opening 25 of the display portion 20. In an exemplary embodiment, the profile of the screen 50 is symmetrical with respect to a longitudinal axis of the display portion 20.

The screen 50 further includes tube connection openings 54*a*, 54*b*, 54*c* and 54*d* positioned to correspond with the top openings of the tubes 27*a*, 27*b*, 27*c*, and 27*d*. The tube connection openings 54*a*, 54*b* that correspond to the tubes 27*a*, 27*b* through which the particles are blown include fittings 56*a*, 56*b* that direct the particles inwards over the top of the screen 50. In exemplary embodiments, the fittings 56*a*, 56*b* direct the particles in a direction within a range of 80° to 100°, preferably 85° to 95°, and in a specific preferred example, 90° relative to the tube openings. In this regard, the fittings 56 include an inside surface that follows a 130° curve inwardly towards the center of the screen 50.

As shown in FIG. 10D, electrical wiring 60 passes through the tube connection openings 54*c*, 54*d* that correspond to the tubes 27*c*, 27*d* that house the electrical wiring.

In operation, particles simulating snow are blown upwards through the tubes 27*a*, 27*b*, and then exit through the fittings 56*a*, 56*b*. The angle of the fittings 56*a*, 56*b* directs the particles over the top surface of the screen 50, and at least partially through action of gravity the particles fall through the screen openings 52. The sloped and convex profile of the screen enhances the even distribution of the particles through the screen openings 52, thereby providing a more realistic snowfall effect over the scene within the display portion 20.

It should be appreciated that the present invention is not limited by application to a snow lantern. For example, a screen and corresponding tubes and fittings as described herein may be used in other products and structures, such as, for example, picture frames, aquariums, radios, cloches, gazebos, 360° scenes in glass formats, and wall frames, to name a few.

While particular embodiments of the present disclosure have been shown and described in detail, it would be obvious to those skilled in the art that various modifications and improvements thereon may be made without departing from the spirit and scope of the disclosure. It is therefore intended to cover all such modifications and improvements that are within the scope of this disclosure.

The invention claimed is:

1. A method of making a decorative enclosure comprising:

providing a display portion comprising a top opening, a front portion and a back portion; and disposing a screen over the top opening of the display portion, the screen sloping downwards from the back portion to the front portion of the display portion, the screen comprising a plurality of screen openings configured to allow passage of particles for the simulation of falling snow within the display portion.

2. The method of claim 1, further comprising providing two or more first tubes through which the particles are blown upwards through the display portion and over a top surface of the screen.

3. The method of claim 2, further comprising providing the two or more first tubes with two or more first tube connection openings.

4. The method of claim 3, further comprising providing the two or more first tube connection openings with fittings that direct the particles over the top surface of the screen.

5. The method of claim 4, wherein the fittings direct the particles at an angle that is 80° to 100° relative to a longitudinal axis of the tubes.

6. The method of claim 4, wherein the fittings direct the particles at an angle that is 90° relative to a longitudinal axis of the tubes.

7. The method of claim 3, further comprising providing the display portion with two or more second tubes that house electrical wiring.

8. The method of claim 7, further comprising providing the screen with two or more second tube connection openings in communication with the two or more second tubes.

9. The method of claim 1, wherein the screen slopes at an angle of 10° to 30°.

10. The method of claim 1, wherein the screen slopes at an angle of 20°.

11. The method of claim 1, further comprising providing the particles at a base portion of the decorative enclosure.

12. A decorative enclosure made in accordance with the method of claim 1.

* * * * *